(12) United States Patent
Hirata

(10) Patent No.: US 12,311,425 B2
(45) Date of Patent: May 27, 2025

(54) WORKPIECE PRODUCTION APPARATUS

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 286 days.

(21) Appl. No.: 18/012,105

(22) PCT Filed: May 28, 2021

(86) PCT No.: PCT/JP2021/020553
§ 371 (c)(1),
(2) Date: Dec. 21, 2022

(87) PCT Pub. No.: WO2022/004222
PCT Pub. Date: Jan. 6, 2022

(65) Prior Publication Data
US 2023/0249239 A1    Aug. 10, 2023

(30) Foreign Application Priority Data
Jun. 29, 2020 (JP) .................................. 2020-111689

(51) Int. Cl.
*B21D 22/02* (2006.01)
*B21D 22/20* (2006.01)

(52) U.S. Cl.
CPC ............. *B21D 22/02* (2013.01); *B21D 22/20* (2013.01)

(58) Field of Classification Search
CPC ........ B21D 13/02; B21D 22/02; B21D 22/20; B21D 22/10; B21D 24/16
(Continued)

(56) References Cited

U.S. PATENT DOCUMENTS 2,422,952 A * 6/1947 Dakin .................. B21D 35/001
29/34 R
2,771,851 A * 11/1956 Mcgregor .............. B21D 22/10
72/397
(Continued)

FOREIGN PATENT DOCUMENTS

JP    8-117880        5/1996
JP    2003-249238     9/2003

OTHER PUBLICATIONS

International Search Report issued in International Application No. PCT/JP2021/020553, dated Jul. 20, 2021, along with an English translation thereof.

*Primary Examiner* — Edward T Tolan
(74) *Attorney, Agent, or Firm* — Greenblum & Bernstein, P.L.C.

(57) ABSTRACT

A workpiece production apparatus includes a stationary die assembly and a movable die assembly. The stationary die assembly includes a stationary die body and a die. The movable die assembly includes a movable die body, a shaping punch, a blanking punch, a first pushing member, and a second pushing member, which has a higher rigidity than the first pushing member. The workpiece production apparatus is configured to bring the movable die assembly close to the stationary die assembly, thereby sequentially performing pre-shaping of a plate, punching-out of a workpiece from the plate, and final shaping of the workpiece by pushing the shaping punch with a distal end of the second pushing member in conjunction with compressive deformation of the first pushing member.

1 Claim, 5 Drawing Sheets

(58) Field of Classification Search
USPC .......................................................... 72/348
See application file for complete search history.

(56) References Cited

U.S. PATENT DOCUMENTS

| | | | | |
|---|---|---|---|---|
| 7,950,261 B2* | 5/2011 | Sasaki | .................... | B21D 35/00 |
| | | | | 72/333 |
| 8,261,591 B2* | 9/2012 | Hielscher | ............... | B21D 37/16 |
| | | | | 72/348 |
| 2003/0131646 A1* | 7/2003 | Herzog | .................. | B21D 13/02 |
| | | | | 72/379.2 |
| 2008/0098789 A1* | 5/2008 | Hori | ........................ | B21D 24/04 |
| | | | | 72/349 |

\* cited by examiner

WORKPIECE PRODUCTION APPARATUS

TECHNICAL FIELD

The present disclosure relates to a workpiece production apparatus.

BACKGROUND ART

Patent Literature 1 discloses a method for producing a grooved plate. In this production method, a corrugated plate is formed by pre-shaping a metal plate with a first die having a corrugated die surface. Subsequently, the plate is subjected to final shaping using a second die, which has a die surface having the same shape as that of grooves to be formed. As a result, multiple grooves, each of which includes flat surfaces, are formed.

CITATION LIST

Patent Literature

Patent Literature 1: Japanese Laid-Open Patent Publication No. 2003-249238

SUMMARY OF INVENTION

Technical Problem

The production method described in Patent Literature 1 requires the first die for performing the pre-shaping and the second die for performing the final shaping. The production method also requires a step of transferring a plate from the first die to the second die. As a result, the production process of the workpiece is complicated.

It is an objective of the present disclosure to provide a workpiece production apparatus that simplifies the production process.

Solution to Problem

In order to achieve the foregoing objective, a workpiece production apparatus is configured to produce a workpiece from a metal plate. The workpiece production apparatus includes a stationary die assembly and a movable die assembly. The stationary die assembly includes a stationary die body and a die that includes a die-side shaping surface. The die-side shaping surface is configured to shape the plate. The movable die assembly includes a movable die body, a shaping punch, a blanking punch, a first pushing member, and a second pushing member. The movable die body is configured to approach and move away from the stationary die assembly. The shaping punch includes a punch-side shaping surface and a proximal end face. The punch-side shaping surface cooperates with the die-side shaping surface to shape the plate. The proximal end face is on a side opposite to the punch-side shaping surface. The blanking punch is fixed to the movable die body on an outer side of the shaping punch. The blanking punch is configured to cooperate with the die to punch out the workpiece from the plate. The first pushing member includes a proximal end fixed to the movable die body and a distal end fixed to the proximal end face of the shaping punch. The second pushing member includes a proximal end fixed to the movable die body and a distal end. A clearance is provided between the distal end and the proximal end face of the shaping punch. The second pushing member has a higher rigidity than the first pushing member. The workpiece production apparatus is configured to bring the movable die assembly close to the stationary die assembly thereby sequentially performing pre-shaping of the plate, punching-out of the workpiece from the plate, and final shaping of the workpiece by pushing the shaping punch with the distal end of the second pushing member in conjunction with compressive deformation of the first pushing member.

DESCRIPTION OF EMBODIMENTS

A workpiece production apparatus according to one embodiment will now be described with reference to FIGS. 1 to 5. A workpiece 100 of the present embodiment is a separator for a fuel cell.

As shown in FIGS. 1 to 5, the production apparatus is an apparatus that produces a workpiece 100 from a metal plate 50, and includes a stationary die assembly 10 and a movable die assembly 20.

Stationary Die Assembly 10

Figure 1:
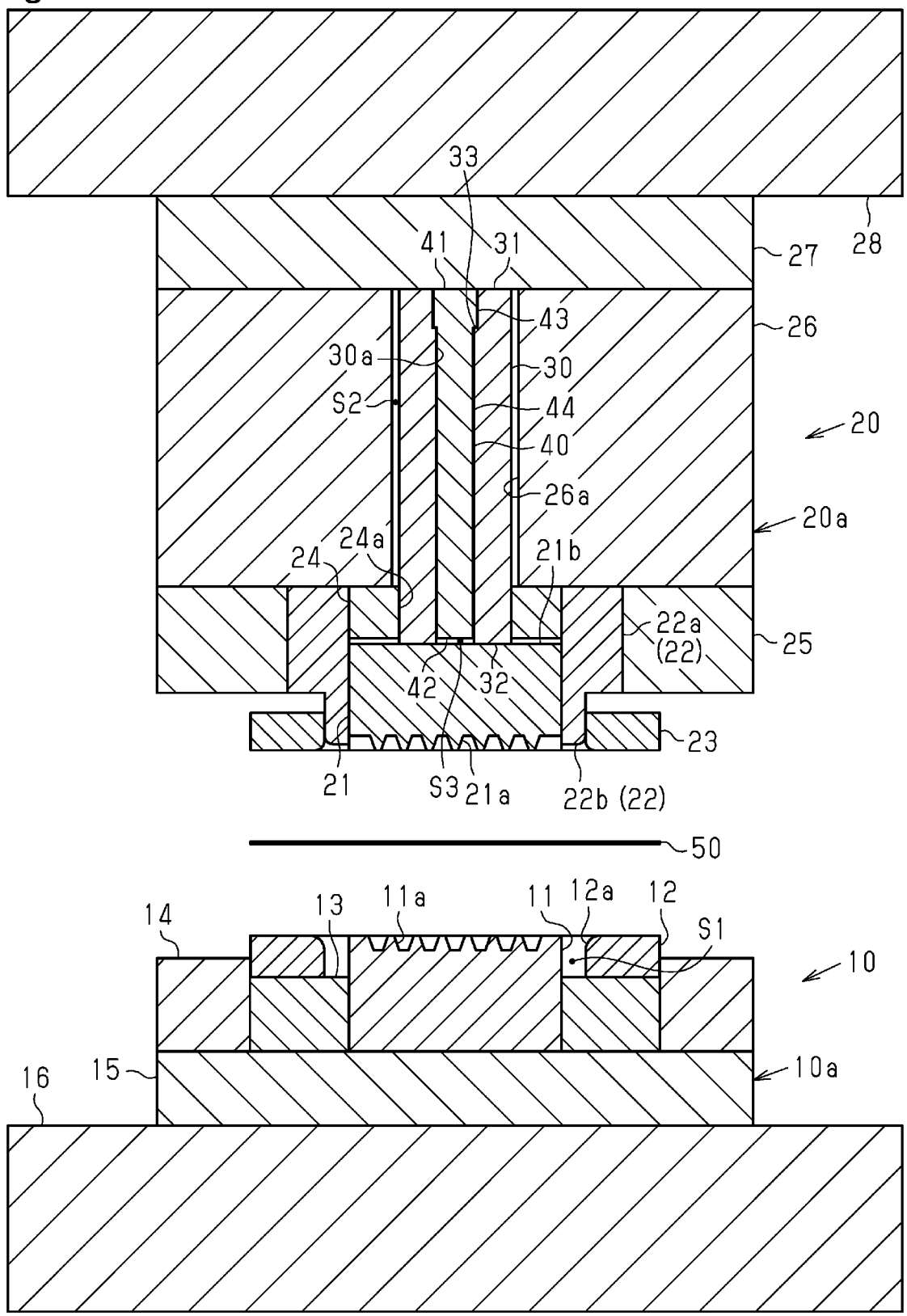
FIG. 1 is a cross-sectional view of a workpiece production apparatus according to one embodiment, illustrating a movable die assembly and a stationary die assembly separated from each other.

As shown in FIG. 1, the stationary die assembly 10 includes a stationary die body 10a and a rectangular parallelepiped die 11. The die 11 includes a die-side shaping surface 11a, which is configured to shape the plate 50.

Figure 5:
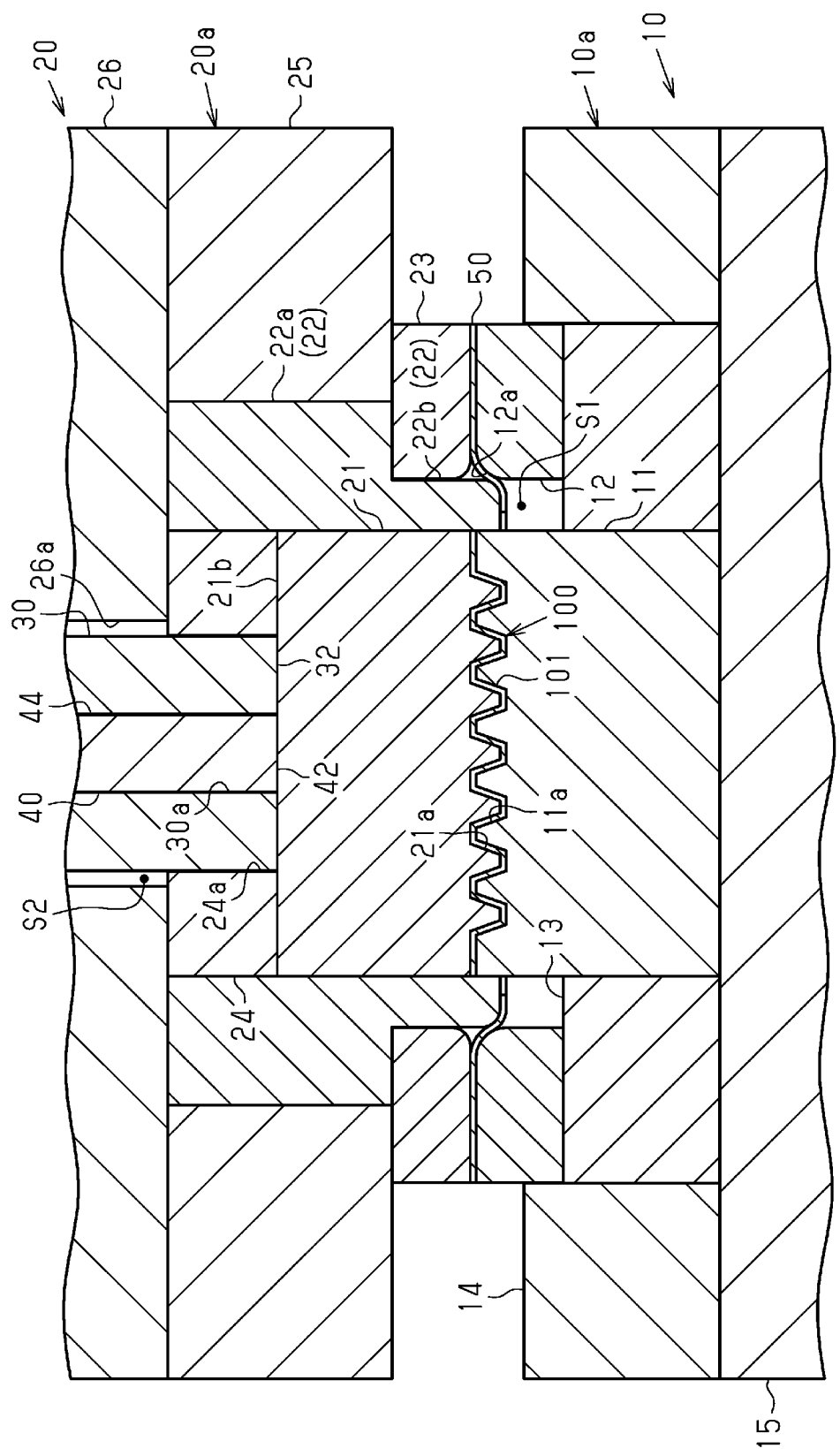
FIG. 5 is a cross-sectional view illustrating a main shaping step performed by the workpiece production apparatus of the embodiment.

As shown in FIG. 5, the die-side shaping surface 11a is provided on the upper surface of the die 11. The die-side shaping surface 11a includes multiple grooves for forming passages 101 on the plate 50.

As shown in FIG. 1, the stationary die body 10a includes a stationary shoe 16, a stationary-side backing plate 15, a die plate 14, a base plate 13, and a stationary-side stripper 12.

The stationary-side backing plate 15 is fixed to the upper surface of the stationary shoe 16 with bolts (not shown).

The die 11, the die plate 14, and the base plate 13 are fixed to the upper surface of the stationary-side backing plate 15.

The die plate 14, which has the shape of a rectangular frame, is provided on the outer side of the die 11.

The base plate 13 has a rectangular parallelepiped shape and is held between the die plate 14 and the die 11.

The stationary-side stripper 12, which has the shape of a rectangular frame, is fixed to the upper surface of the base plate 13. A clearance S1 is provided over the entire circumference between the inner peripheral surface of the stationary-side stripper 12 and the outer peripheral surface of the die 11.

Figure 2:
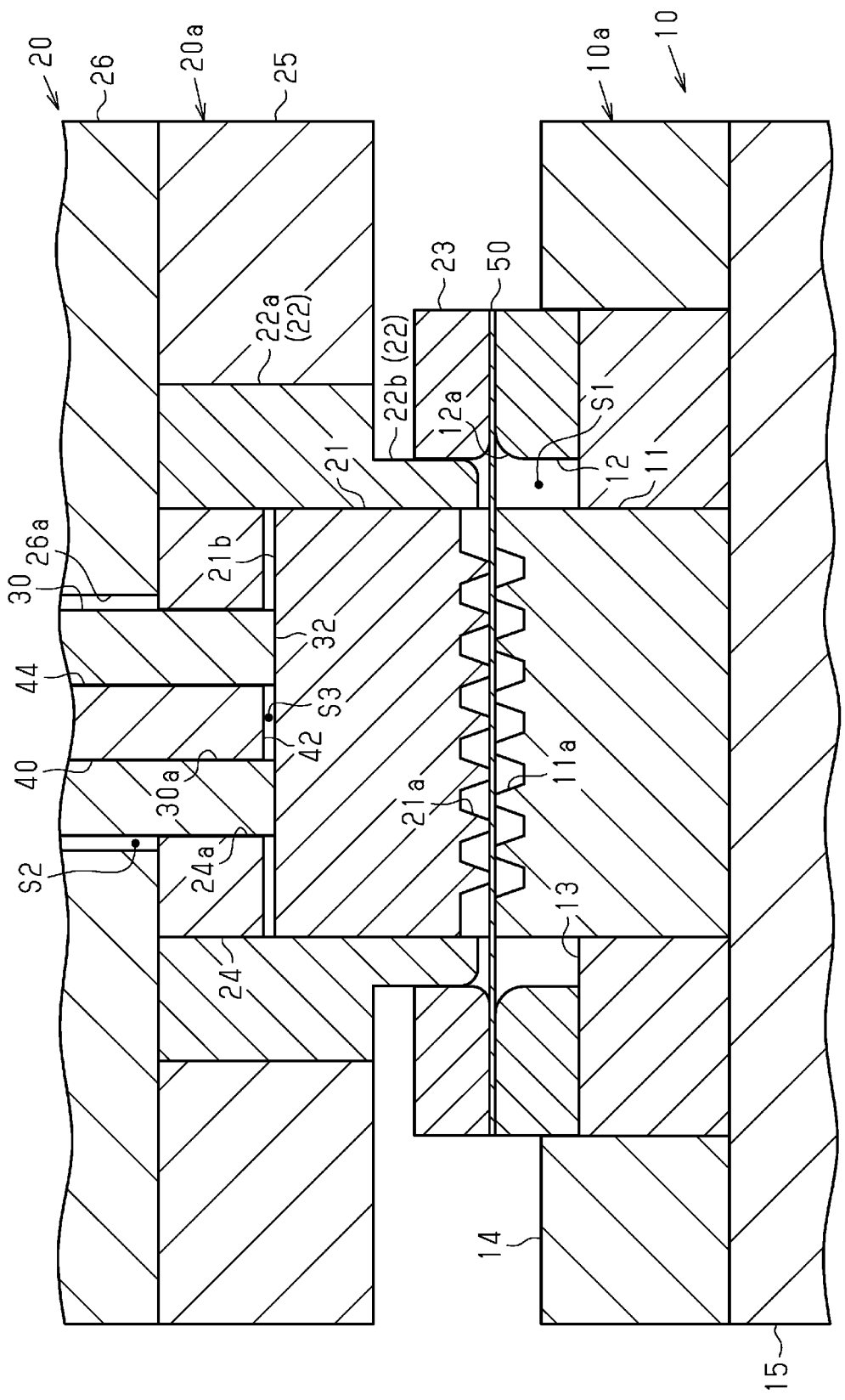
FIG. 2 is a cross-sectional view illustrating a state in which a plate is restrained by the stationary die assembly and the movable die assembly of the embodiment.

The upper-inner edge 12a of the stationary-side stripper 12 is filleted over the entire circumference so as to have an arcuate cross-sectional shape (FIG. 2).

Movable Die Assembly 20

As shown in FIG. 1, the movable die assembly 20 includes a movable die body 20a and a shaping punch 21 having a rectangular parallelepiped shape. The movable die body 20a is located above the stationary die assembly 10 and can be moved up and down. The shaping punch 21 includes a punch-side shaping surface 21a, which cooperates with the die-side shaping surface 11a of the die 11 to shape the plate 50. The movable die body 20a is configured to approach and move away from the stationary die assembly 10.

As shown in FIG. 5, the punch-side shaping surface 21a is provided on the lower surface of the shaping punch 21. The punch-side shaping surface 21a includes multiple grooves for forming the passages 101 on the plate 50. A proximal end face 21b is provided on the upper surface of the shaping punch 21. That is, the shaping punch 21 includes the proximal end face 21b on the side opposite to the punch-side shaping surface 21a.

As shown in FIGS. 1 and 2, the movable die assembly 20 includes a blanking punch 22. The blanking punch 22 is fixed to the movable die body 20a on the outer side of the shaping punch 21. The blanking punch 22 is configured to cooperate with the die 11 to punch out the workpiece 100 from the plate 50.

As shown in FIG. 1, the movable die body 20a includes a movable shoe 28, a movable-side backing plate 27, a punch backing plate 26, a punch plate 25, a punch holder 24, and a movable-side stripper 23.

The movable shoe 28 is configured to be moved vertically by a driving device (not shown).

The movable-side backing plate 27 is fixed to the lower surface of the movable shoe 28 with bolts (not shown).

The punch backing plate 26 is fixed to the lower surface of the movable-side backing plate 27. The punch backing plate 26 includes a center hole 26a, which extends vertically through the punch backing plate 26.

The punch holder 24, the punch plate 25, and the blanking punch 22 are fixed to the lower surface of the punch backing plate 26.

The punch holder 24 includes a center hole 24a, which extends vertically through the punch holder 24. The punch holder 24 is fixed to an inner peripheral portion of the lower surface of the punch backing plate 26.

The punch plate 25, which has the shape of a rectangular frame, is provided on the outer side of the punch holder 24.

The blanking punch 22, which has the shape of a rectangular frame, is held between the punch holder 24 and the punch plate 25.

The blanking punch 22 includes a base portion 22a, which is opposed to the inner peripheral surface of the punch plate 25, and a protruding portion 22b, which protrudes downward from the base portion 22a. The outer peripheral surface of the protruding portion 22b is located on the inner side of the outer peripheral surface of the base portion 22a. The inner peripheral surface of the protruding portion 22b is flush with the inner peripheral surface of the base portion 22a.

The shaping punch 21 is provided inside the blanking punch 22 so as to be displaceable in the vertical direction relative to the blanking punch 22.

The frame-shaped movable-side stripper 23 is fixed to the outer peripheral surface of the distal portion of the protruding portion 22b.

The movable-side stripper 23 and the stationary-side stripper 12 hold the plate 50.

Pushing Members 30, 40

As shown in FIG. 1, the shaping punch 21 is fixed to the movable-side backing plate 27 by a first pushing member 30. The first pushing member 30 is passed through the center hole 26a of the punch backing plate 26 and the center hole 24a of the punch holder 24.

The first pushing member 30 has a shape of a quadrangular post extending in the vertical direction, that is, in the moving direction of the movable die assembly 20. The first pushing member 30 includes a through-hole 30a, which extends in the vertical direction. The through-hole 30a, for example, has a circular cross section.

A proximal end 31 of the first pushing member 30 is fixed to the lower surface of the movable-side backing plate 27 with bolts (not shown).

A distal end 32 of the first pushing member 30 is fixed to the proximal end face 21b of the shaping punch 21 with bolts (not shown).

An upper end portion (proximal portion) of the through-hole 30a has a larger diameter than the portion below the upper end portion. Accordingly, a step 33 is provided on the inner peripheral surface of the through-hole 30a.

A second pushing member 40, which has a higher rigidity than the first pushing member 30, is inserted into the through-hole 30a of the first pushing member 30.

The second pushing member 40 has a shape of a circular post extending in the vertical direction, that is, in the moving direction of the movable die assembly 20. In the following description, a radial direction (lateral direction in FIG. 1), which is orthogonal to the axial direction of the second pushing member 40, may be simply referred to as a radial direction.

A proximal portion 43 of the second pushing member 40 has a larger diameter than a remaining portion 44 of the second pushing member 40. The lower surface of the proximal portion 43 is engaged with the step 33 of the through-hole 30a. A proximal end 41 of the second pushing member 40 is in contact with the lower surface of the movable-side backing plate 27. Accordingly, the proximal end 41 is fixed to the movable-side backing plate 27, that is, to the movable die body 20a. A specified clearance S3 is provided between a distal end 42 of the second pushing member 40 and the proximal end face 21b of the shaping punch 21.

A specified clearance S2 is provided between the outer peripheral surface of the first pushing member 30 and the inner peripheral surface of the punch backing plate 26 over the entire length in the vertical direction.

A specified clearance (not shown) is provided between the outer peripheral surface of the first pushing member 30 and the inner peripheral surface of the punch holder 24 over the entire length in the vertical direction.

These clearances have sizes that allow displacement of the first pushing member 30 relative to the punch backing plate 26 and the punch holder 24 when the first pushing member 30 is deformed by being compressed in the vertical direction and expanded in the radial direction.

A clearance (not shown) is provided between the inner peripheral surface of the first pushing member 30 and the outer peripheral surface of the second pushing member 40.

This clearance has a size that allows displacement of the first pushing member 30 and the second pushing member 40 relative to each other when the first pushing member 30 is deformed by being compressed in the vertical direction and expanded in the radial direction.

The Young's modulus of the material of the first pushing member 30 is preferably 70 to 80 GPa. As such a material, super duralumin or extra super duralumin, which is a kind of aluminum alloy, is preferable. The first pushing member 30 of the present embodiment is made of extra super duralumin.

The Young's modulus of the material of the second pushing member 40 is preferably 500 to 600 GPa. Such a material is preferably cemented carbide. The second pushing member 40 of the present embodiment is made of a cemented carbide including tungsten carbide as a major component.

The present embodiment is configured to bring the movable die assembly 20 close to the stationary die assembly 10, thereby sequentially performing pre-shaping of the plate 50, punching-out of the workpiece 100 from the plate 50, and final shaping of the workpiece 100 by pushing the shaping punch 21 with the distal end 42 of the second pushing member 40 in conjunction with the compressive deformation of the first pushing member 30.

Operation of the present embodiment will now be described.

When the movable die assembly 20 is brought close to the stationary die assembly 10, the plate 50 is held between the stationary-side stripper 12 and the movable-side stripper 23 as shown in FIG. 2. As a result, the plate 50 is restrained between the stationary die assembly 10 and the movable die assembly 20.

Figure 3:
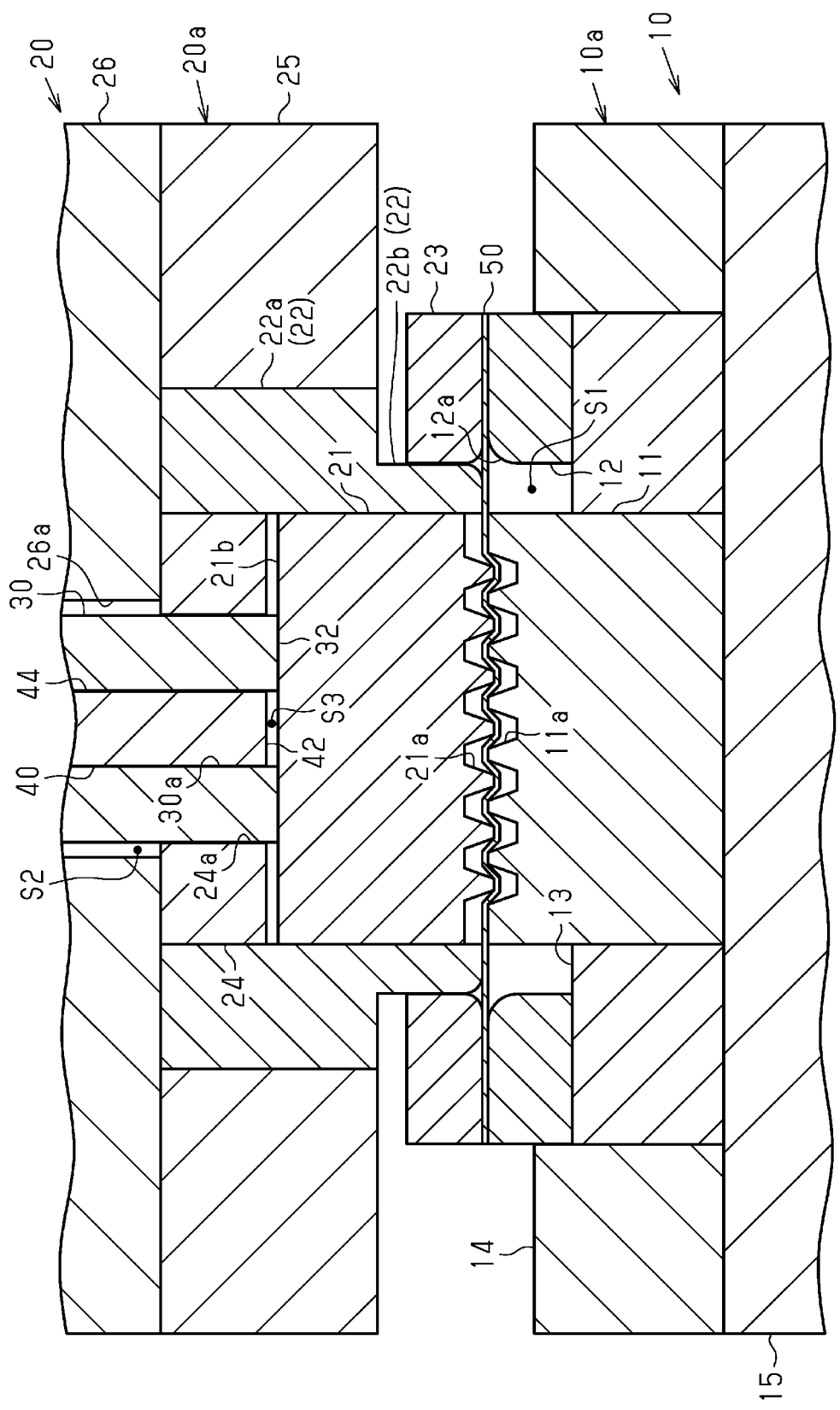
FIG. 3 is a cross-sectional view illustrating a pre-shaping step performed by the workpiece production apparatus of the embodiment.

When the movable die assembly 20 is brought further closer to the stationary die assembly 10 as shown in FIG. 3, the plate 50 is pressed by the punch-side shaping surface 21a of the shaping punch 21, which is pushed by the first pushing member 30, and the die-side shaping surface 11a of the die 11 (pre-shaping step).

Figure 4:
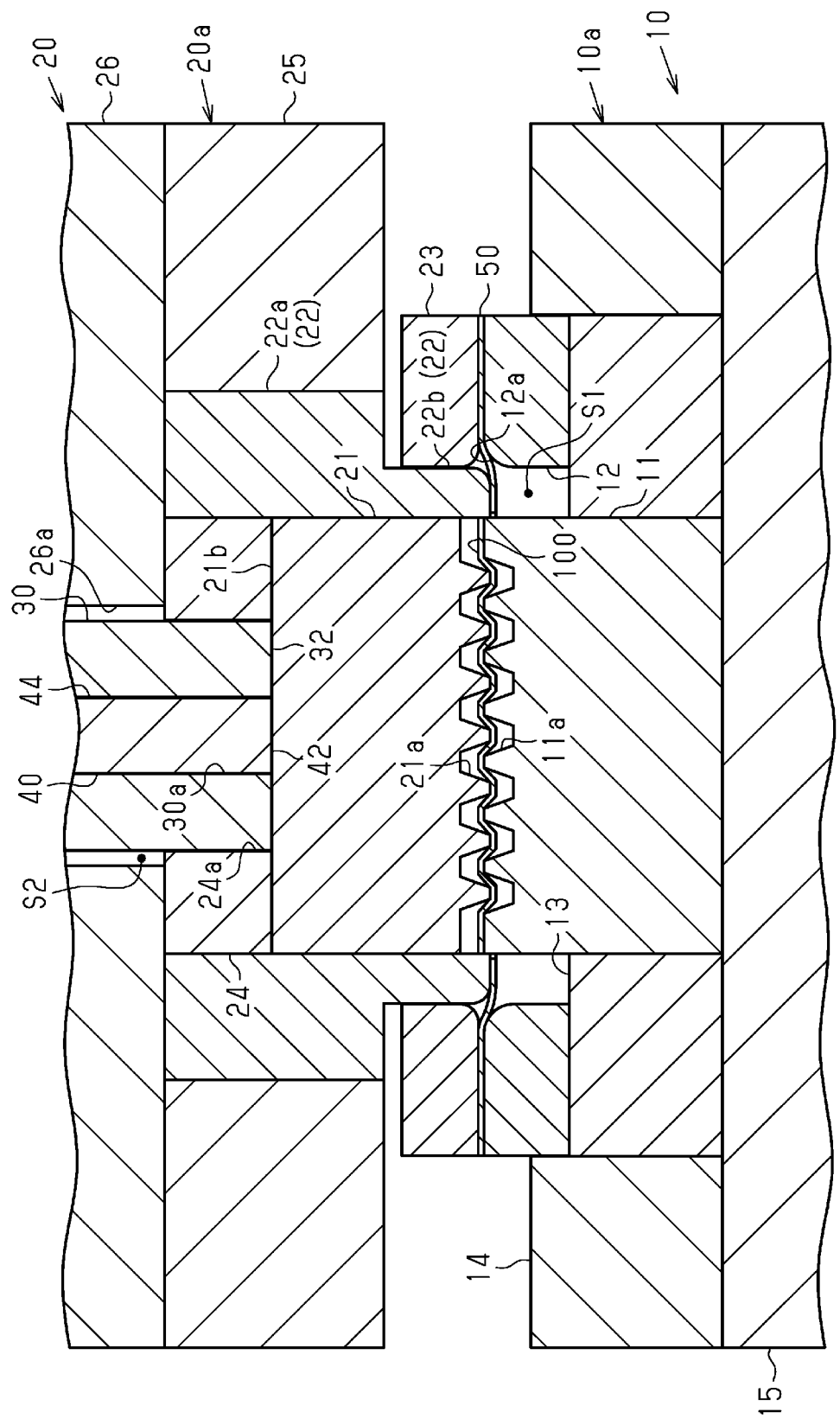
FIG. 4 is a cross-sectional view illustrating a punching-out step performed by the workpiece production apparatus of the embodiment.

When the movable die assembly 20 is brought further closer to the stationary die assembly 10 so that the distal end of the protruding portion 22b of the blanking punch 22 is moved to a position lower than the die-side shaping surface 11a of the die 11 as shown in FIG. 4, the workpiece 100 is punched out from the plate 50 by cooperation of the blanking punch 22 and the die 11 (punching-out step).

At this time, the first pushing member 30 is deformed by being compressed in the vertical direction, i.e., in the moving direction of the movable die assembly 20, so that the distance between the distal end 42 of the second pushing member 40 and the proximal end face 21b of the shaping punch 21 gradually decreases.

When the distal end 42 of the second pushing member 40 comes into contact with the proximal end face 21b of the shaping punch 21, the shaping punch 21 is pushed by the second pushing member 40 in addition to the first pushing member 30. Accordingly, the workpiece 100 is pressed by the shaping punch 21 and the die 11 as shown in FIG. 5. At this time, the plate 50, from which the workpiece 100 has been punched out, is pressed by the protruding portion 22b of the blanking punch 22 and the upper-inner edge 12a of the stationary-side stripper 12 (final shaping step).

The present embodiment has the following advantages.

(1) The movable die assembly 20 includes the first pushing member 30 and the second pushing member 40, which has a higher rigidity than the first pushing member 30. The first pushing member 30 includes the proximal end 31, which is fixed to the movable die body 20a, and the distal end 32, which is fixed to the proximal end face 21b of the shaping punch 21. The second pushing member 40 includes the proximal end 41, which is fixed to the movable die body 20a, and the distal end 42. The clearance S3 is provided between the distal end 42 and the proximal end face 21b of the shaping punch 21. The workpiece production apparatus is configured to bring the movable die assembly 20 close to the stationary die assembly 10, thereby sequentially performing the pre-shaping of the plate 50, the punching-out of the workpiece 100 from the plate 50, and the final shaping of the workpiece 100 by pushing the shaping punch 21 with the distal end 42 of the second pushing member 40 in conjunction with the compressive deformation of the first pushing member 30.

This configuration operates in the above-described manner.

In a configuration in which the workpiece 100 is punched out from the plate 50 after the final shaping, the workpiece 100 may shrink due to the punching.

In this regard, in the above-described configuration, the shrinkage of the workpiece 100 is undone by performing the final shaping of the workpiece 100 after the workpiece 100 is punched out from the plate 50.

In this manner, the above-described configuration performs the pre-shaping, the punching-out, and the final shaping through successive steps of bringing the movable die assembly 20 close to the stationary die assembly 10. This simplifies the process of producing the workpiece 100.

(2) The second pushing member 40 is made of a material having a larger Young's modulus than that of the first pushing member 30. The first pushing member 30 has a shape of a post extending in the moving direction of the movable die assembly 20.

For example, if a coil spring is used as the first pushing member 30, it is necessary to increase the rigidity of the first pushing member 30 in order to shape the plate 50, which has a high rigidity. The size of the first pushing member 30 needs to be increased, accordingly. As a result, the size of the production apparatus is increased.

In this regard, the above-described configuration can easily increase the rigidity of the first pushing member 30 without increasing the size of the first pushing member 30. Therefore, the size of the production apparatus is not increased.

(3) The second pushing member 40 has a shape of a post extending in the moving direction of the movable die assembly 20.

For example, if a coil spring is used as the second pushing member 40, it is necessary to increase the rigidity of the second pushing member 40 in order to shape the plate 50, which has a high rigidity. The size of the second pushing member 40 needs to be increased, accordingly. As a result, the size of the production apparatus is increased.

In this regard, the above-described configuration can easily increase the rigidity of the second pushing member 40 without increasing the size of the second pushing member 40. Therefore, the size of the production apparatus is not increased.

(4) The first pushing member 30 includes the through-hole 30a, which extends in the moving direction of the movable die assembly 20. The second pushing member 40 is inserted into the through-hole 30a.

This configuration allows the second pushing member 40 to be easily positioned with respect to the first pushing member 30.

(5) The upper-inner edge 12*a* of the stationary-side stripper 12 is filleted over the entire circumference so as to have an arcuate cross-sectional shape.

With this configuration, the plate 50, from which the workpiece 100 has been punched out, is pressed by the protruding portion 22*b* of the blanking punch 22 and the upper-inner edge 12*a* of the stationary-side stripper 12, so that the inner edge of the plate 50 is moved outward. Therefore, the plate 50 can be removed without interfering with the workpiece 100.

Modifications

The above-described embodiment may be modified as follows. The above-described embodiment and the following modifications can be combined as long as the combined modifications remain technically consistent with each other.

The number of the second pushing member 40 is not limited to one as described in the above-described embodiment, but may be more than one. In this case, the number of the through-hole 30*a* may be changed in accordance with the number of the second pushing members 40.

The arrangement of the first pushing member 30 and the second pushing member 40 is not limited to that illustrated in the above-described embodiment, but may be changed. For example, the positions of the first pushing member 30 and the second pushing member 40 may be switched. That is, the second pushing member 40 may include a through-hole into which the first pushing member 30 is inserted. Further, the second pushing member 40 may be provided outside the first pushing member 30. In this case, the through-hole 30*a* of the first pushing member 30 can be omitted.

The shape of the first pushing member 30 and the shape of the second pushing member 40 are not limited to the shapes illustrated in the above-described embodiment. For example, the first pushing member 30 may have a shape of a circular post, and the second pushing member 40 may have a shape of a polygonal post.

The material of the second pushing member 40 is not limited to a cemented carbide including tungsten carbide as a major component illustrated in the above-described embodiment, but may be another alloy produced by sintering powder of another hard metal carbide, for example.

The second pushing member 40 may include, for example, a coil spring. In this case, it suffices if the second pushing member 40 has a higher rigidity than the first pushing member 30.

The material of the first pushing member 30 is not limited to super duralumin or extra super duralumin illustrated in the above-described embodiment, but may be another aluminum alloy, for example.

The first pushing member 30 may include, for example, a coil spring. In this case, it suffices if the first pushing member 30 has a lower rigidity, that is, is more elastic, than the second pushing member 40.

Forging may be performed on the workpiece 100 in the final shaping of the workpiece 100 by pressing the shaping punch 21 with the distal end 42 of the second pushing member 40.

The configurations of the stationary die body 10*a* and the movable die body 20*a* are not limited to the configurations illustrated in the above-described embodiment, but may be changed.

The workpiece production apparatus according to the present disclosure is not limited to an apparatus for producing a separator for a fuel cell, but can be used to produce any workpiece as long as the workpiece is produced from a metal plate.

The invention claimed is:

1. A workpiece production apparatus configured to produce a workpiece from a metal plate, the workpiece production apparatus comprising a stationary die assembly and a movable die assembly, wherein
the stationary die assembly includes:
   a stationary die body; and
   a die that includes a die-side shaping surface, the die-side shaping surface being configured to shape the plate,
the movable die assembly includes:
   a movable die body that is configured to approach and move away from the stationary die assembly;
   a shaping punch that includes a punch-side shaping surface and a proximal end face, the punch-side shaping surface cooperating with the die-side shaping surface to shape the plate, and the proximal end face being on a side opposite to the punch-side shaping surface;
   a blanking punch that is fixed to the movable die body on an outer side of the shaping punch, the blanking punch being configured to cooperate with the die to punch out the workpiece from the plate;
   a first pushing member that includes a proximal end fixed to the movable die body and a distal end fixed to the proximal end face of the shaping punch; and
   a second pushing member that includes a proximal end fixed to the movable die body and a distal end, a clearance being provided between the distal end and the proximal end face of the shaping punch, and the second pushing member having a higher rigidity than the first pushing member, and
the workpiece production apparatus is configured to bring the movable die assembly close to the stationary die assembly thereby sequentially performing pre-shaping of the plate, punching-out of the workpiece from the plate, and final shaping of the workpiece by pushing the shaping punch with the distal end of the second pushing member in conjunction with compressive deformation of the first pushing member,
wherein the second pushing member is made of a material having a larger Young's modulus than that of the first pushing member,
wherein the second pushing member has a shape of a post extending in a moving direction of the movable die assembly,
wherein the first pushing member has a shape of a post extending in the moving direction of the movable die assembly, the first pushing member having a through-hole that extends in the moving direction, and
wherein the second pushing member is inserted into the through-hole.

* * * * *